United States Patent [19]

Ruf

[11] Patent Number: 4,792,494

[45] Date of Patent: Dec. 20, 1988

[54] USE OF MODIFIED POLYETHYLENE FOR FINISHING GLASS SURFACES

[75] Inventor: Erich Ruf, Essen, Fed. Rep. of Germany

[73] Assignee: Th. Goldschmidt AG

[21] Appl. No.: 81,479

[22] Filed: Aug. 4, 1987

[30] Foreign Application Priority Data

Aug. 27, 1986 [DE] Fed. Rep. of Germany ....... 3629167

[51] Int. Cl.$^4$ .................... B32B 17/10; B32B 31/00
[52] U.S. Cl. .................... 428/426; 428/432; 428/441; 525/333.8; 525/333.7
[58] Field of Search ............ 525/333.7, 333.8, 333.9; 420/520, 500, 426, 432, 441

[56] References Cited

U.S. PATENT DOCUMENTS

| 3,864,268 | 2/1975 | Culbertson et al. | 525/333.7 X |
| 4,068,056 | 1/1978 | Engel et al. | 525/333.7 X |
| 4,204,029 | 5/1980 | Batchelor et al. | 428/441 |

FOREIGN PATENT DOCUMENTS

| 0017056 | 8/1964 | Japan | 525/333.7 |
| 0020356 | 9/1968 | Japan | 525/333.7 |

*Primary Examiner*—Nancy A. B. Swisher
*Attorney, Agent, or Firm*—Toren, McGeady & Associates

[57] ABSTRACT

Modified polyethylene with an average molecular weight of 500 to 10,000 is disclosed. The polyethylene has one or more laterally bound group(s) of the formula

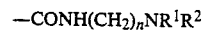
$-CONH(CH_2)_nNR^1R^2$ wherein $R^1$ and $R^2$ are the same or different and represent a low molecular weight alkyl group with 1 to 4 carbon atoms and n is 2 or 3, or its salts with aliphatic carboxylic acids with 1 to 3 carbon atoms. The modified polyethylene is applied in the form of an aqueous dispersion, to glass surfaces, especially the external surfaces of glass containers. The modified polyethylene is suitable especially for so-called cold-end finishing. The protective layers obtained have very good smoothing values. The protective layers are resistant to the repeated action of hot, aqueous washing liquors and retain their smoothness. Glass containers, provided with the protective layer, can be labelled in the usual manner.

4 Claims, No Drawings

USE OF MODIFIED POLYETHYLENE FOR FINISHING GLASS SURFACES

FIELD OF THE INVENTION

The invention relates to the use of modified polyethylene for finishing or improving glass surfaces, especially the external surfaces of glass containers.

More particularly, the invention relates to the after-finishing of glass surfaces, which have a thin surface layer of metal oxides, such as tin oxides (so-called hot-end finishing), with aqueous dispersions of mofified polyethylene (so-called cold-end finishing) to improve the smoothness of the surfaces and to increase their scratch resistance.

BACKGROUND INFORMATION AND PRIOR ART

The strength of glass depends on the intactness of the glass surface. Immediately after glass is produced, its strength is highest. However, the strength is reduced when the glass surface has nicks or scratches. Numerous methods are therefore known for protecting the surfaces of objects of glass against mechanical damage.

For example, it is known to treat glass objects immediately after they are shaped at temperatures between 370° and 750° C. with inorganic or organic compounds of titanium, tin or zirconium (the so-called hot-end finishing). With this treatment, thin, colorless, transparent, protective metal oxide layers are formed on the surfaces of the hot-finished glass objects.

To further increase the scratch hardness, the strength and especially the smoothness of glass objects, it is known that an additional protective organic layer may be applied on glass objects which are coated with metal oxides.

From the extensive patent literature, the following are cited as being illustrative of the state of the art.

In the German Pat. No. 1,291,448, a method is described to increase the scratch hardness and strength of glass objects, especially of glass bottles, by producing a thin, colorless, transparent, protective layer on the external surfaces of the glass objects. The characteristic feature of this method resides in that thin layers of a pyrolyzable inorganic salt or of a pyrolyzable organic compound of titanium, zirconium, tin or vanadium, applied on the glass objects, are decomposed pyrolytically on the glass objects at temperatures between 370° and 705° C. to the corresponding metal oxides, whereupon the glass objects are cooled to temperatures between 230° and 65.5° C. and an olefin polymer, a polyurethane, a polystyrene or an acetate salt of an alkylamine are sprayed on the still hot glass surfaces. An example of an olefin polymer is a polyethylene wax of low molecular weight, which is used in the form of an aqueous emulsion. As emulsifier, the alkali metal salt of a fatty acid, especially potassium oleate, is used. The thickness of the protective layer on the glass object is about 1 µm. These films of polyethylene wax are, however, not resistant to soap suds and, when the container is cleaned, are detached after a relatively short time by the wash-active substances of the hot cleaning liquor.

German Pat. No. 1,298,681 discloses a method for coating glass objects with a wear-resistant and slideable coating. This method is characterized in that an aqueous solution of a reaction product of polyvinyl alcohol, an emulsified polyolefin, preferably emulsified polyethylene, and an acid compound is applied to the surface of the glass object.

The German Pat. No. 1,596,742 relates to a method for preparing long-lasting smooth protective layers on glass objects, for which the protective layer is applied from a mixture of a dispersed polyolefin and a polyoxyethylene derivative of a fatty acid on the glass object heated to 70° to 225° C. The disperse polyolefin preferably is polyethylene. Preferably polyoxyethylene monostearate is used as polyoxyethylene derivative of a fatty acid.

The German Pat. No. 2,432,478 discloses a glass container with a protective layer of an ionic copolymer of an α-olefin and an α,β-ethylenically unsaturated carboxylic acid, the glass container additionally having a sliding coating with the following components in parts by weight:

1 part of at least one of the following salts: calcium stearate, zinc stearate, calcium oleate, zinc oleate;
0.5 to 2 parts of a soluble polyvinyl alcohol; and
1.7 to 3.6 parts of at least one of the following oleates: potassium oleate, sodium oleate and ammonium oleate.

German Offenlegungsschrift No. 1,495,137 teaches a method for preparing modified polyolefin waxes, in which oxygen-containing polyolefin waxes, which have an oxygen content of 1 to 10% by weight, a peroxide content of 0.001 to 0.3% by weight and an acid number of at least 1, are reacted with compounds, which have at least one nitrogen atom which may be substituted. These modified polyolefin waxes may be added to polyolefins and improve their affinity for dyestuffs. The usefulness of polyolefin waxes, so modified, for the surface finishing of glass objects, can not be inferred from this Offenlegungsschrift, nor is this surprising usefulness made obvious by it.

The coating materials described in the prior art, are, however, not able to fulfill all the requirements for a satisfactory protective layer material for glass surfaces. These protective layers must fulfill especially the following demands:

The protective layers should effectively protect the glass surface against mechanical damage, such as occurs when the glass containers rub against one another during cleaning, filling or packaging or come into frictional contact with metal surfaces of the cleaning, filling or packaging machines.

The protective layers should be able to withstand numerous cleaning and washing procedures, for example, in dishwashing machines. The protective layers must also be resistant to attack by hot, aqueous washing liquors at elevated temperatures.

The protective layers must have a good sliding capability so that the treated glass containers are readily manageable. The term "sliding capability" means that the layers act in the manner of a lubricant when contacted by another object such as another glass bottle.

The protective layers should adhere well to glass surfaces, so that, when damaged at a point or a small area, they cannot readily be pulled from the glass surface.

Labels, especially labels with a pressure-sensitive coating, must adhere adequately to the protective layers of the coating to ensure that the treated glass containers can be labelled.

The protective layers must be physiologically safe, since the majority of glass containers having such protective layers are used for packaging foods or beverages.

Finally, the protective layers should not significantly increase the ultimate price of the glassware so treated.

OBJECTS OF THE INVENTION

It is the primary object of the invention to provide a protective layer material, which superiorly meets the above-mentioned requirements. Another object is to render possible the application of the protective layer material in the form of an aqueous dispersion. Preferably, the protective layer material is applied on glass containers, which have previously been hot-finished with organometallic compounds under the formation of a metal oxide layer and still have a temperature of about 50° to 150° C. (cold-end finishing). Generally, it is an object of the invention to improve on the art of protective layers for glass surfaces.

SUMMARY OF THE INVENTION

Surprisingly, it has now been discovered that a polyethylene, modified in a particular manner, permits the formation of protective layers having the desired property profile.

Pursuant to the invention, a modified polyethylene with an average molecular weight of 500 to 10,000 is used which has one or more laterally bound group(s) of the formula $$-CONH(CH_2)_nNR^1R^2 \qquad \text{I}$$

wherein $R^1$ and $R^2$ are the same or different and represent a lower alkyl group with 1 to 4 carbon atoms or its salts with aliphatic carboxylic acids with 1 to 3 carbon atoms and n is 2 or 3. The polyethylene is preferably used in the form of an aqueous dispersion. The polyethylene modified in this manner is superiorly suitable for the finishing of glass surfaces, especially of the external surface of glass containers.

The modified polyethylene has preferably an average molecular weight of 1,000 to 5,000. The average polymeric molecule should have 1 to 10 and preferably 1 to 5 laterally bound groups of Formula I.

$R^1$ and $R^2$ may be the same or different. Preferably, however, they are the same. They may be methyl, ethyl, propyl, isopropyl, butyl or isobutyl. Preferably both $R^1$ and $R^2$ are methyl.

The subscript n preferably has a value of 3.

The polyethylene preferably has 1 to 10 laterally bound groups of Formula I.

As aliphatic carboxylic acid, acetic acid is preferred; however, formic acid and propionic are also usable.

The preparation of the modified polyethylene, to be used pursuant to the invention, is described in the German Offenlegungsschrift No. 1,495,137 and, in keeping with the state of the art, is carried out by reacting partially oxidized polyethylene with dialkylamines of the formula $H_2N(CH_2)_nNR^1R^2$, $R^1$, $R^2$ and the subscript n being as defined above.

Preferably, a partially oxidized and optionally esterified polyethylene with an acid number of 20 to 40 and especially of 20 to 30 and a saponification number of 20 to 70 and especially of 40 to 60 is used for the modification.

The modified polyethylene, to be used pursuant to the invention, provides on glass surfaces smooth protective layers with outstanding sliding capability. The protective layers adhere very well to glass surfaces and are therefore particularly suited for the after-finishing of used bottles (reusable bottles).

The protective layers are resistant to the repeated action of hot, aqueous washing liquors and retain their smoothness.

The glass containers, provided with the protective layers, can be labelled in the usual manner.

The special smoothing effect of the modified polyethylene to be used in accordance with the invention, is also demonstrated by the fact that hot-end finished glass containers which are immersed in a polyethylene dispersion at room temperature or onto whose external surfaces the dispersion is sprayed, still show a good smoothing effect even in the wet state or after the action of water of condensation on the coated glass surface. By contrast, with other cold-end finishing agents based on unmodified polyethylene, this is the case only after such layers have commenced to dry.

The modified polyethylene to be used in accordance with the invention, is usually applied in the form of an aqueous dispersion on the glass surface and dried there to form the protective layer. The polyethylene dispersion generally is applied at the end of a hot-end finishing with utilization of the residual heat of the glass container to be finished and which is at a glass temperature of 50 to 150° C. For this purpose, the dispersion is sprayed on the glass surface. It is also possible to immerse the glass containers in the dispersion.

Dispersants known from the art may be used to prepare suitable dispersions of the modified polyethylene. Suitable dispersants are, for example, water-soluble addition products of ethylene oxide on fatty alcohols or alkylphenols.

However, those boundary surface-active compounds, which have betaine or amine oxide groups as hydrophilic groups and long-chain alkyl groups as hydrophobic groups, have proven to be particularly useful as dispersants.

An example of such a suitable betaine is a compound of the general formula

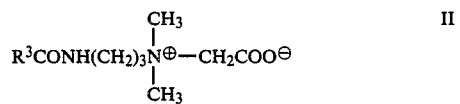

$$\text{II}$$

wherein $R^3$ is a long-chain alkyl group, derived from a fatty acid and with 7 to 17 carbon atoms on the average.

In a similar manner, an amine oxide of the following formula

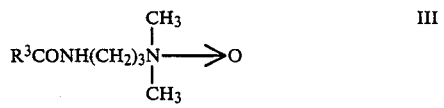

$$\text{III}$$

wherein $R^3$ is as defined above, is suitable as a dispersant.

Such betaines and amine oxides are known from the state of the art.

To prepare the dispersions, the polyethylene, which has been modified in accordance with the invention, is melted and the dispersant or dispersant mixture is advantageously dissolved or dispersed uniformly in the aqueous phase. The melt of the modified polyethylene is added with intensive stirring to the water, which has been heated to 60° to 95° C. It is advisable to cool the dispersion obtained slowly with stirring. Advantageously a cooling rate of about 1° to 3° C./min should be maintained.

The dispersions, formed using the betaines of Formula II or the amine oxides of Formula III, are not sensitive to the salts, which cause water to be hard.

Generally, the inventive dispersions may have the following compositions (in percent by weight):

|  | Limit Values | Preferred | Particularly preferred |
|---|---|---|---|
| Modified polyethylene | 1–40 | 1–40 | 1–25 |
| Dispersant | 0.4–30 | 1–20 | 1–15 |
| Water | 98.6–30 | 98–40 | 98–60 |

For finishing glass surfaces, the dispersion may be used directly or optionally after dilution to 0.1–2% by weight of polyethylene.

In the following example, the production of the modified polyethylene, the preparation of an aqueous dispersion of this modified polyethylene and the use of this dispersion for cold-end finishing are demonstrated, it being understood that this example is given by way of illustration and not by way of limitation.

EXAMPLE

In a 2 L 4-neck flask equipped with stirrer, thermometer, distillation bridge, receiver and dropping funnel, 800 g of a polyethylene wax with a saponification number of about 40 to 60 are melted and, at a temperature of 120° C., mixed quickly with stirring with 100 g of dimethylaminopropylamine supplied from a dropping funnel.

The reaction mixture is subsequently heated with stirring for about 4 to 5 hours to about 170° C. Subsequently, under the vacuum produced by a water-jet pump and while continuing the stirring (with the product temperature at about 170° C.), the water or alcohol from the reaction and the excess amine are distilled off. About 874 g of amidopropyldimethylamino group-containing polyethylene are obtained.

This polyethylene (71.5 g), which has been modified in accordance with the invention, is heated to about 145° C. and added in liquid form to a dropping funnel. The dropping funnel discharges into an emulsifying vessel, which is provided with a stirrer, thermometer and reflux condenser. In the emulsifying vessel, there is a mixture, heated to 95° C., of 376.6 g of water, 12.5 g of a 35% aqueous solution of coconut fatty acid amidopropyldimethylamine oxide and 39.4 g of a coconut fatty amine, to which 50 moles of ethylene oxide have been added and which is present in the form of the acetate. The hot polyethylene is added dropwise to this mixture with intensive stirring (inventive Dispersion 1).

A second dispersion is prepared in the same manner. For this purpose, 71.5 g of the polyethylene, modified in accordance with the invention, is heated to about 140° C. and added to the dropping funnel. In the emulsifying vessel as described, there are 363.5 g of water, 60.0 g of a 30% aqueous solution of the coconut fatty acid amidopropylbetaine and 5 g of acetic acid. The mixtue is heated to 90° C. The modified polyethylene, heated to 140° C., is stirred into the aqueous solution. The dispersion is stirred well while it is cooling, a cooling rate of about 2° C./min being maintained (inventive Dispersion 2).

For carrying out the comparison experiments, wet beer bottles, which had been subjected to a hot-end finishing of 50 ctu (coating thickness unit) and which were at room temperature, were used.

The following polyethylene dispersion of the state of the art was used for comparison. Partially oxidized polyethylene with a saponification number of 40 to 50 is melted with a nonionic emulsifier and dispersed with hot water. The dispersion contains 24% solids.

The inventive Dispersions 1 and 2 and the comparison dispersions are diluted for use with deionized water in the ratio of 1:50. The beer bottles, which are at room temperature, are completely immersed in this dispersion and pulled out again immediately. After that, scratch-test values are determined with the help of a scratch resistance tester (a) without further treatment
(b) after rinsing with water.

The following values are measured:
Dispersion with unmodified polyethylene:

| (a) without further treatment: | 1 to 2 kg |
|---|---|
| (b) after rinsing with water: | 1 kg |

Dispersion 1 with polyethylene modified pursuant to the invention:

| (a) without further treatment | >25 kg |
|---|---|
| (b) after rinsing with water | 15 kg |

Dispersion 2 with polyethylene modified pursuant to the invention:

| (a) without further treatment | >25 kg |
|---|---|
| (b) after rinsing with water | 20 kg |

These experiments, carried out under conditions simulating practical conditions, show that polyethylene, modified in accordance with the invention, makes wet finishing of glass bottles possible and that the finished glass surface is capable of withstanding a load that is 25 times as great without formation of scratches or other surface defects.

I claim:

1. A glass object having a surface coating, wherein the coating comprises modified polyethylene of an average molecular weight of 500 to 10,000, said modified polyethylene having at least one laterally bound group of the formula $$-CONH(CH_2)_nNR^1R^2, \qquad I$$

wherein $R^1$ and $R^2$ are the same or different and represent lower alkyl with 1 to 4 carbon atoms or its salts with aliphatic carboxylic acids of 1 to 3 carbon atoms, and n=2 or 3.

2. The glass object of claim 1, wherein the glass object has a metal oxide layer interposed between the surface coating and the glass surface.

3. The glass object of claims 1 or 2, wherein the modified polyethylene has an average molecular weight of 1000 to 5000 and the average polymeric molecule has 1 to 10 laterally bound groups of Formula I.

4. The glass object of claims 1 or 2, wherein both $R^1$ and $R^2$ are methyl.

* * * * *